Feb. 2, 1932.   J. M. PESTARINI   1,843,730
ENGINE GENERATOR SET FOR VEHICLES
Filed June 7, 1928
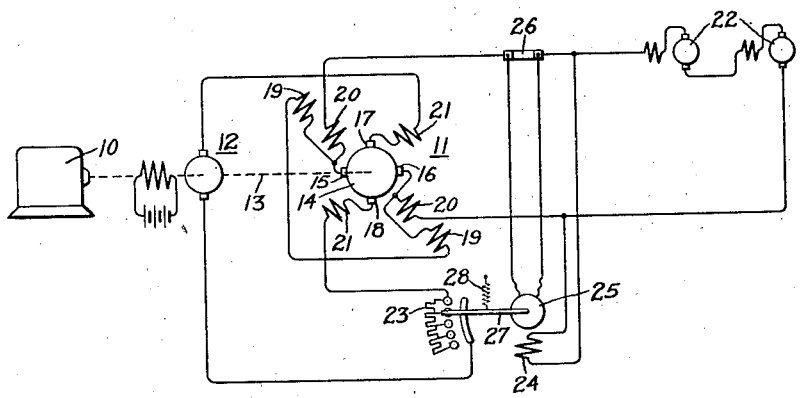
Inventor:
Joseph M. Pestarini,
by Charles E. Tullar
His Attorney.

Patented Feb. 2, 1932

1,843,730

UNITED STATES PATENT OFFICE

JOSEPH M. PESTARINI, OF ST. OUEN, FRANCE, ASSIGNOR TO GENERAL ELECTRIC COMPANY, A CORPORATION OF NEW YORK

ENGINE-GENERATOR SET FOR VEHICLES

Application filed June 7, 1928, Serial No. 283,708, and in France June 17, 1927.

My invention relates to engine-generator sets for vehicles having driving motors connected to the generators for propelling the vehicles.

The engines or prime movers used on vehicles of this kind develop substantially constant power for any given speed and it is desirable to operate them at substantially constant speed under varying current demand of the driving motors of the vehicle because the engines can be most satisfactorily designed for operation under this condition. The driving motors require heavy current at low voltage in starting because the counter electromotive force of the motors is low, and as the vehicle increases in speed the motors require small current at substantially higher voltage because the counter electromotive force of the motors increases. If the engine is to be under the same load, as the current demand by the motors on the generator decreases from a maximum to that required at running speed of the vehicle, it is apparent that the product of the current output and the voltage of the generator must remain constant, that is to say, the power output of the generator must remain constant. In order to approximate this condition it has, heretofore, been the practice to differentially compound the generator so as to give it a rapidly drooping characteristic curve. However, in such a machine the voltage increases more or less rapidly than the current decreases from starting to running speed of the vehicle whereas constant power demand requires that the voltage should increase at the same rate as the current decreases during the starting period. As a result, the generators have, heretofore, either under-loaded the engines and increased their speed, or overloaded them and slowed them down during a portion of the range in current demand on the generator, so that the power of the engine has not been effectively utilized.

The object of my invention is to utilize the full power output of the engine for a given constant speed throughout the range of variation in current demand on the generator without reducing the speed of the engine. I accomplish this by providing means for controlling the electrical characteristics of the generator to maintain substantially constant load on the engine throughout the range of variation in current demand on the generator.

My invention will be more fully set forth in the following description referring to the accompanying drawings and the features of novelty which characterize my invention will be pointed out with particularity in the claims annexed to and forming a part of this specification.

In the drawings, the single figure diagrammatically illustrates a vehicle having an engine driven generator and motors connected thereto for driving the vehicle.

Referring to the drawings, the vehicle shown may be of any desired form and comprises an engine or prime mover 10, a generator 11, and its exciter 12, which are preferably connected together by a shaft indicated by the dotted line at 13. The armature of the generator is provided with a commutator 14 having load brushes 15 and 16 bearing thereon which are arranged on the neutral axis of the machine, and having auxiliary brushes 17 and 18 bearing thereon which are arranged 90 electrical degrees from the load brushes.

In the particular construction which I have shown for convenience in illustration, the generator is excited by windings 19 and 20 arranged on certain of the poles, and by windings 21 which are arranged on others of the poles or distributed as desired. The windings 19 are connected across the load brushes 15 and 16, and the windings 20 are connected in series with the load circuit including driving motors 22 of the vehicle. The exciter 12, which in this instance is separately excited, is connected across the auxiliary brushes 17 and 18 by a circuit including the windings 21 and a variable resistance 23. In this machine the current supplied by the exciter produces a field flux in the windings 21 and also a flux along the axis of the brushes 17 and 18 in passing through the armature, which increases the generated voltage across the load brushes over that due to the windings 19 and 20. It will thus be seen that the voltage across the load brushes can be controlled by varying the voltage applied to the auxiliary brushes by the exciter.

In accordance with my invention, the generator is controlled so as to maintain constant power output throughout the range of variation in current demand thereon by the driving motors, which decreases gradually from a maximum when the vehicle is starting to a smaller value when the vehicle reaches full speed. In the particular generator which I have shown this is done by a controlling device having a fixed coil 24 which is connected across the load circuit so as to be energized in accordance with the voltage across the same, and a movable coil 25 which is connected across resistance element 26, or if desired across a winding of the machine, so as to be energized in accordance with the current in the load circuit. A contact arm 27, which is movable to vary the resistance 23, is secured to the movable coil 25 and is biased by a spring 28 to a position in which the variable resistance 23 in series with the exciter 12 is a minimum. It will thus be seen that the movement of the arm 27 against the spring 28 is a function of the product of the voltage and load current of the generator 11 so that the resistance 23 will be varied by movement of the arm 27 to maintain constant power output of the generator.

The operating characteristics of the vehicle can be most readily explained by the following analysis:

Let $N$ = the speed of rotation of the generator.
$\varphi_1$ = The flux along the axis of the auxiliary brushes 17 and 18.
$\varphi_2$ = The flux along the axis of the load brushes 15 and 16.
$i_1$ = the current in the exciter circuit.
$i_2$ = the current in the load circuit.
$e_1$ = The exciter voltage less the voltage drop through the variable resistance 23.
$e_2$ = the voltage across the load circuit.
$R_1$ = armature resistance across the auxiliary brushes and the resistance of windings 21.
$R_2$ = armature resistance across the brushes and the resistance of the fields 20.
$R$ = the load resistance.
$k_1$ = the factor of proportionality between $\varphi_1$ and $i_1$.
$k_2$ = the factor of proportionality between $\varphi_2$ and $i_2$.
$k_a$ = the constant of the machine in the general voltage equation of a direct current machine across the brushes 17 and 18.
$k_b$ = the constant of the machine in the general equation of a direct current machine across the load brushes 15 and 16.

$P$ = the power output of the generator.

$$K = \frac{k_b k_1}{k_a k_b k_1 k_2}$$

$K_1$ = Factor of proportionality between $e_1$ and P.
$K_2$ = Factor of proportionality between N and P.

Neglecting saturation, $$\varphi_1 = k_1 i_1 \qquad (1)$$
$$\varphi_2 = k_2 i_2 \qquad (2)$$
$$e_1 = i_1 R_1 + k_a N \varphi_2 \qquad (3)$$
$$e_2 = i_2 R = -i_2 R_2 + k_b N \varphi_1 \qquad (4)$$

Substituting the value of $\varphi_2$ from (2) in equation (3), $$e_1 = i_1 R_1 + k_a N k_2 i_2 \qquad (5)$$

Solving (5) for $i_1$, $$i_1 = \frac{e_1 - k_a N k_2 i_2}{R_1} \qquad (6)$$

Substituting the value of $\varphi_1$ from (1) in (4), $$e_2 = i_2 R = -i_2 R_2 + k_b N k_1 i_1 \qquad (7)$$

From (7)

$$i_2(R + R_2) = k_b N k_1 i_1 \qquad (8)$$

Substituting the value of $i_1$ from (6) in (8).

$$i_2(R + R_2) = \frac{k_b N k_1}{R_1}(e_1 - k_a N k_2 i_2) \qquad (9)$$

$$= \frac{k_b N k_1 e_1}{R_1} - \frac{k_a k_b N^2 k_1 k_2 i_2}{R_1} \qquad (10)$$

From (10), $$i_2\left(R + R_2 + \frac{k_a k_b N^2 k_1 k_2}{R_1}\right) = \frac{k_b N k_1 e_1}{R_1} \qquad (11)$$

Then, $$i_2 = \frac{k_b N k_1 e_1}{R_1(R + R_2) + k_a k_b N^2 k_1 k_2} \qquad (12)$$

The quantity $R_1(R+R_2)$ in this particular instance is made negligible compared to $k_a k_b N^2 k_1 k_2$ so that (12) becomes:

$$i_2 = \frac{k_b k_1 e_1}{k_a k_b k_1 k_2 N} = K \frac{e_1}{N} \qquad (13)$$

From the Equation (13) it is apparent that the load current $i_2$ is inversely proportional to the speed N, for constant resistance load, and if the ratio of the voltage $e_1$ applied to the auxiliary brushes to the speed N is maintained constant the load current $i_2$ will be constant for a fixed resistance load as the speed N of the generator varies.

Now, the power output P of the generator for a load R is:

$$P = i_2^2 R \qquad (14)$$

Substituting the value of $i_2$ from (13), $$P = \frac{K^2 e_1^2 R}{N^2} \qquad (15)$$

It will be observed from Equation (15) that the power output P of the generator varies inversely as the square of the speed N and directly as the square of the voltage $e_1$. In order, therefore, to maintain constant power the ratio of $$\frac{e_1}{N}$$

must remain constant, and as the coils 24 and 25 act on the resistance controlling arm to maintain constant power they must maintain $$\frac{e_1}{N}$$

constant. From this, in connection with Equation (13), it is apparent that for constant resistance load the load current $i_2$ is constant for varying generator speed N.

From the foregoing it will be seen that I have provided a vehicle having an engine-generator set for supplying current to the driving motors thereof, in which constant load is maintained on the engine throughout the range of current demand by the driving motors on the generator, and in which for constant resistance load the current output of the generator remains constant as the engine speed varies.

Although I have described my invention in connection with a vehicle having a particular form of generator, I do not desire to be limited to the construction shown and described, except as defined in the appended claims.

What I claim as new and desire to secure by Letters Patent of the United States is:

1. A vehicle comprising an engine, a generator having an armature driven by said engine provided with a commutator, load brushes bearing on said commutator, a driving motor for said vehicle connected in a circuit across said load brushes, a plurality of auxiliary brushes on said commutator having an exciter and a field exciting winding for said generator connected across said brushes, and means responsive to the electrical condition of said motor circuit for controlling said exciter and for maintaining substantially constant load on said engine throughout the range of variation in current demand of said driving motor on said generator.

2. A vehicle comprising an engine, a generator having an armature provided with a commutator, load brushes bearing on said commutator, a driving motor for said vehicle connected in a circuit across said load brushes, a plurality of auxiliary brushes having an exciter connected across the same, and means responsive to the electrical condition of said motor circuit for varying the voltage applied to said auxiliary brushes by said exciter in such manner as to maintain substantially constant load on said engine throughout the range of current demand of said motor on said generator.

3. A vehicle comprising an engine, a generator having an armature provided with a commutator, load brushes bearing on said commutator, a driving motor for said vehicle connected in a circuit across said load brushes, a field magnet structure having a plurality of poles, one of said poles having a field exciting winding connected in series in said motor circuit and another field exciting winding connected across said load brushes, auxiliary brushes bearing on said commutator, an exciter and a field exciting winding on another of said poles connected in series across said auxiliary brushes, and means responsive to the electrical conditions of said load circuit for varying the voltage applied across said auxiliary brushes in such manner as to maintain substantially constant load on said engine throughout the range of variation in current demand of said driving motor on said generator.

4. A vehicle comprising an engine, a generator having an armature provided with a commutator, load brushes bearing on said commutator, a driving motor for said vehicle connected in a circuit across said load brushes, a field magnet structure having a plurality of poles, one of said poles having a field exciting winding connected in series in said motor circuit and another field exciting winding connected across said load brushes, auxiliary brushes bearing on said commutator, an exciter and a field exciting winding on another of said poles connected in series across said auxiliary brushes, a variable resistance in series with said exciter, and means including relatively movable coils energized in accordance with the current in said load circuit and the voltage across said load brushes for varying said resistance in such manner as to maintain substantially constant load on said engine throughout the range of variation in current demand of said driving motor on said generator.

5. A vehicle comprising an engine, a generator having an armature provided with a commutator, load brushes bearing on said commutator, a driving motor for said vehicle connected in a circuit across said load brushes, a field magnet structure having a plurality of poles, one of said poles having a field exciting winding connected in series in said motor circuit and another field exciting winding connected across said load brushes, auxiliary brushes bearing on said commutator, an exciter and a field exciting winding on another of said poles connected in series across said auxiliary brushes, a variable resistance in series with said exciter and having a spring associated therewith for biasing said resistance to a minimum, and means including relatively movable coils energized in accordance with the current in said load circuit and the voltage across said load brushes for varying said resistance in such manner as to maintain substantially constant load on said engine throughout the range of variation in current demand.

In witness whereof, I have hereunto set my hand this 25th day of May, 1928.

JOSEPH M. PESTARINI.

CERTIFICATE OF CORRECTION.

Patent No. 1,843,730.   Granted February 2, 1932, to

JOSEPH M. PESTARINI.

It is hereby certified that error appears in the printed specification of the above numbered patent requiring correction as follows: Page 2, line 50, after the article "the" insert the word load; and that the said Letters Patent should be read with this correction therein that the same may conform to the record of the case in the Patent Office.

Signed and sealed this 22nd day of March, A. D. 1932.

(Seal)

M. J. Moore,
Acting Commissioner of Patents.